(12) United States Patent
Fukuda et al.

(10) Patent No.: US 6,270,266 B1
(45) Date of Patent: *Aug. 7, 2001

(54) OPTICAL APPARATUS

(75) Inventors: Tsuyoshi Fukuda; Tatsuo Konno; Toshio Matsumoto, all of Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/759,865

(22) Filed: Sep. 16, 1991

Related U.S. Application Data (63) Continuation of application No. 07/619,769, filed on Nov. 29, 1990, now abandoned.

(30) Foreign Application Priority Data

Dec. 4, 1989 (JP) .................................................. 1-315567
Dec. 4, 1989 (JP) .................................................. 1-315568
Dec. 19, 1989 (JP) .................................................. 1-146065

(51) Int. Cl.$^7$ .................................................. G03B 17/00
(52) U.S. Cl. .................................................. 396/529; 396/535
(58) Field of Search .................................. 354/286; 396/71, 396/529, 530, 531, 532, 533, 535

(56) References Cited

U.S. PATENT DOCUMENTS 4,239,364 * 12/1980 Doi ....................................... 354/286
4,970,558 * 11/1990 Matsuda et al. ..................... 354/286

* cited by examiner

*Primary Examiner*—David M. Gray
(74) *Attorney, Agent, or Firm*—Robin, Blecker & Daley (57) ABSTRACT

In an optical apparatus having a mount adapted to be rotated to be attached to and detached from a mount of another apparatus, the mount of the optical apparatus is molded by plastic material, and concave and convex portions are provided on an abutment surface of the mount of the optical apparatus to reduce the sliding area, thereby making the scratches caused by the sliding inconspicuous.

11 Claims, 10 Drawing Sheets

OPTICAL APPARATUS

This is a continuation application under 37 CFR 1.62 of prior application Ser. No. 07/619,769, filed Nov. 29, 1990, now abandoned.

BACKGROUND OF THE INVENTION

1. Field of the Invention

This invention relates to an optical apparatus such as a camera, lens, intermediate tube, etc., having mounts for coupling.

2. Description of the Related Art:

The conventional mounts for the camera and the lens have been made either by machining metal to the shape, or after having sintered stainless steel material, by applying treatments in portions.

For this reason, the conventional mounts for the camera and the lens require a long manufacturing process, thus being parts of very high price.

Figure 4A:
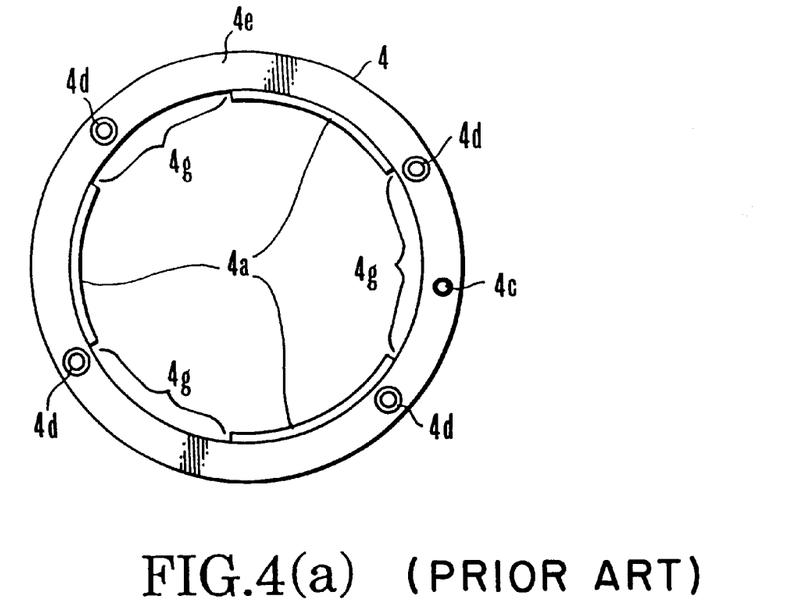
FIGS. 4(a) and 4(b) are respectively a front view and a back view of the conventional metallic mount for camera.
Figure 4B:
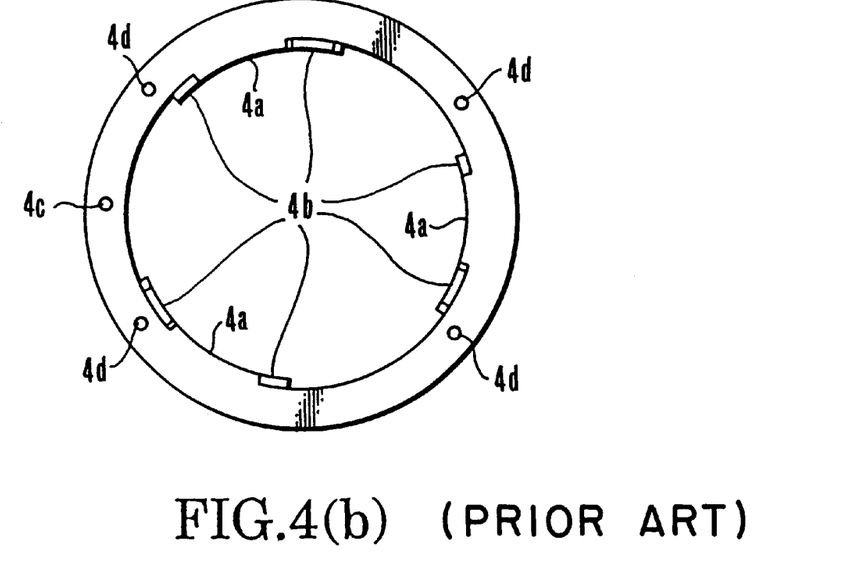

FIGS. 4(a) and 4(b) show an example of metallic mount for camera, with FIG. 4(a) being a front view and FIG. 4(b) being a back view. This mount is of the bayonet type. A plurality of pawl portions 4a are formed on the inner periphery of the mount 4. Protuberances 4b are provided on the back side of these pawl portions 4a.

Figure 2:
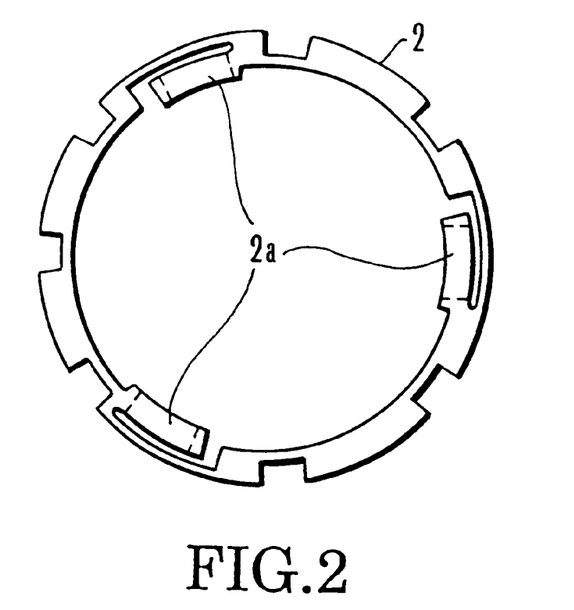
FIG. 2 is a front view of the mount spring.
Figure 3:
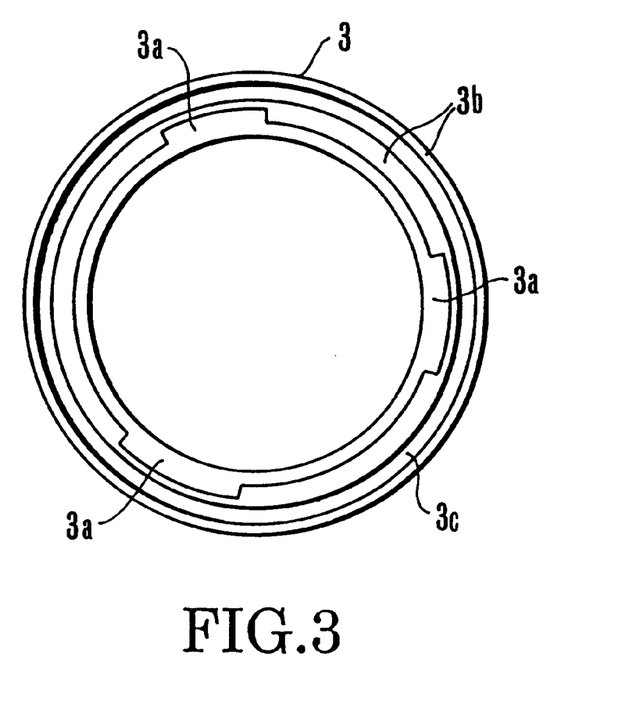
FIG. 3 is a front view of the lens mount of the photographic lens.

Also, a plurality of screw-threaded holes 4d at which the mount 4 is to be fixedly secured to the camera body (not shown) are formed in the circumferential direction, and the abutment surface 4e at which the mount 4 abuts on a mount 3 of the photographic lens shown in FIG. 3 is formed to an even plane. The mount 4 for camera is provided with a mount spring 2 shown in FIG. 2. When the photographic lens is attached to the camera body, the mount spring 2 abuts on portions of the lens mount 3 and functions to press the photographic lens against the camera body, as the spring portions 2a work as springs. The lens mount 3 has pawl portions 3a which are arranged to abut on the spring portions 2a of the mount spring 2 to receive the forces therefrom, a so-called abutment surface 3b which is arranged to abut on the abutment surface 4e of the camera mount to determine the axial position of the photographic lens, and a concave portion 3c formed therein. Incidentally, among the photographic lenses, there are some which do not have the concave portion 3c.

Figure 5:
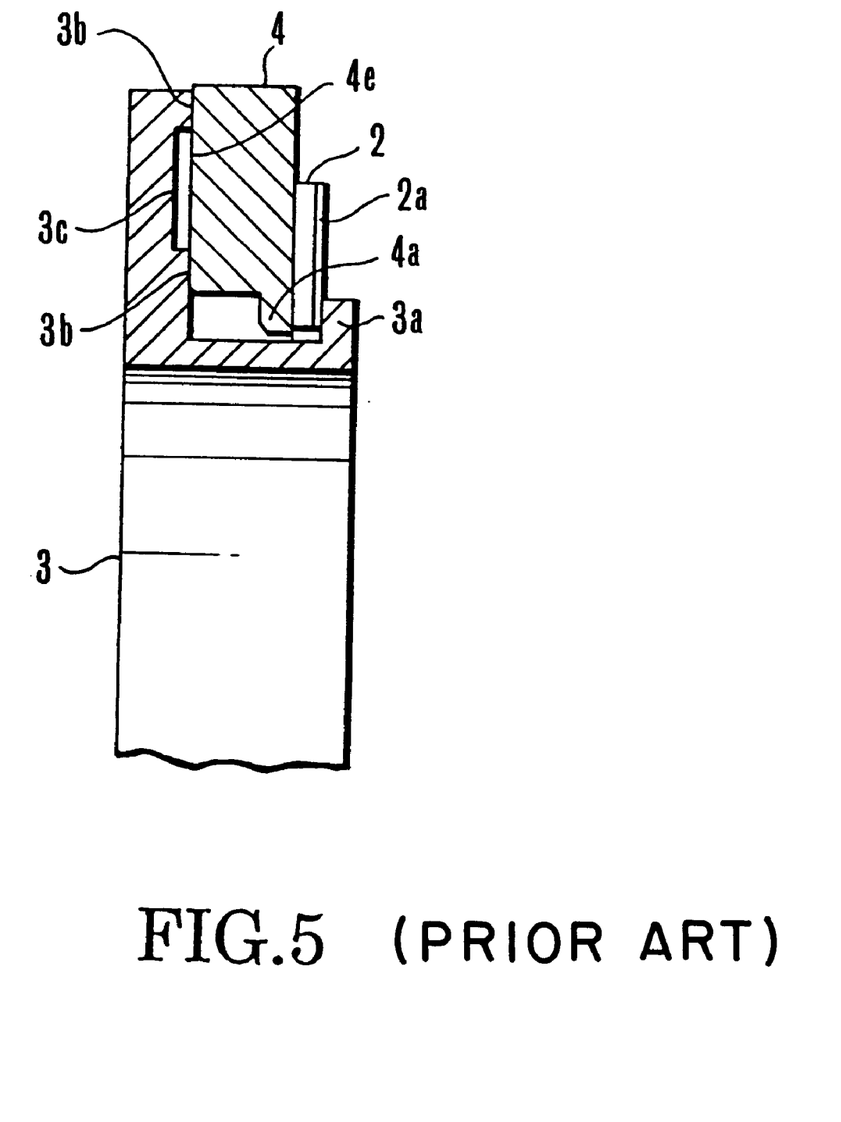
FIG. 5 is a sectional view illustrating the state in which the photographic lens is attached to the mount for camera shown in FIGS. 4(a) and 4(b).

The state in which the photographic lens has been attached to the mount 4 for camera made of metal constructed in such a way is shown in FIG. 5. Coupling of the lens mount 3 of the photographic lens with the mount 4 for camera is to move the lens mount 3 from the left of FIG. 5 toward the mount 4 for camera to be fitted therein, adjust the pawls 3a of the lens mount 3 to the pawlless portions 4g of the mount 4, move the lens mount 3 until the abutment surface 3b of the lens mount 3 abuts on the abutment surface 4e of the camera mount 4, and rotate the lens mount 3 until it is stopped by a stopper member (not shown). At this time, the pawl portions 3a of the lens mount 3 are urged by the spring portions 2a of the mount spring 2, and receive the bias force of direction to the left in FIG. 5. The abutment surface 4e of the mount 4 for the camera abuts on the abutment surface 3b of the lens mount 3, and the axial position of the photographic lens relative to the camera body is determined.

By the way, since the conventional mount for camera is made of metal, its manufacturing process is long, resulting in very expensive parts.

So, it may also be considered to mold the mount by using plastic material. However, the member molded of plastic material is weak in its surface hardness as compared with metallic material. When the photographic lens is attached to the camera, that surface which abuts on the metallic mount 3 of the lens side, particularly the force receiving surface, is apt to get scratches, which may extremely degrade the camera product.

That is, during the photographic lens attaching work, the lens mount 3 rotates, while receiving the force of the mount springs 2. Because a large frictional force exists between the mount 4 for camera and the lens mount 3 made of metal, the mount 4 for camera, too, must be made of a material having an equal or higher surface hardness than that of the lens mount 3. Otherwise, the mount 4 for camera would take large scratches. In the case of the lens mount not having the concave portion 3c, the scratches occur at random. In the case of the lens mount having the concave portion 3c, they occur in ring shapes. Thus, the state of scratches becomes conspicuous as differing from the non-contact portions. In either case, the camera product would be extremely degraded.

SUMMARY OF THE INVENTION

One aspect of this invention is to mold the mount for coupling with another apparatus from plastic material, and make the abutment surface which, when coupling, comes into sliding contact with the other apparatus, to be formed into convex and concave shape, thereby making the scratches inconspicuous.

BRIEF DESCRIPTION OF THE INVENTION

DETAILED DESCRIPTION OF THE PREFERRED EMBODIMENTS

Figure 1A:
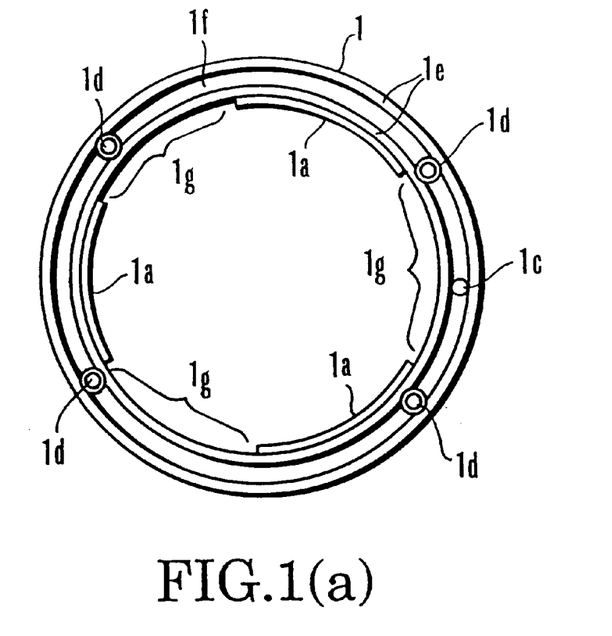
FIGS. 1(a) and 1(b) are respectively a front view and a back view of a first embodiment of the mount for camera.
Figure 1B:
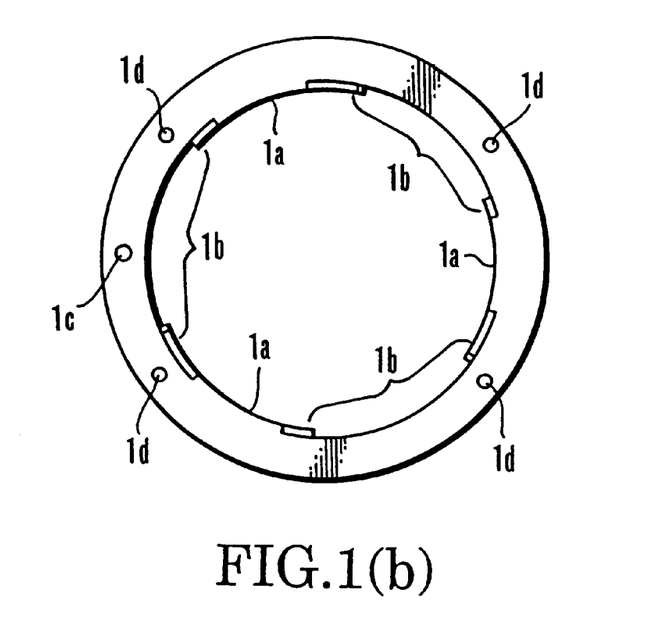
Figure 6:
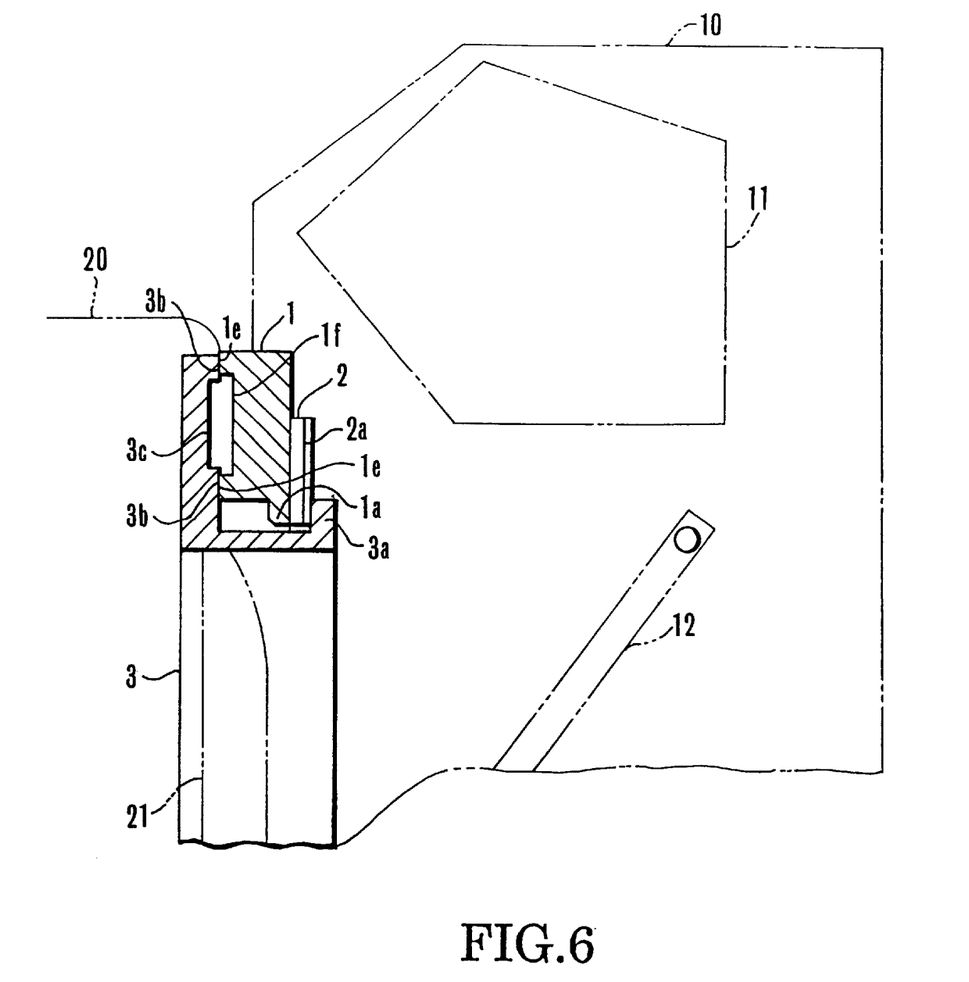
FIG. 6 is a sectional view of the state in which the photographic lens is attached to the camera having the mount for camera shown in FIGS. 1(a) and 1(b).

FIGS. 1(a) and 1(b) show a first embodiment of the mount for camera according to the invention, with FIG. 1(a) being a front view and FIG. 1(b) being a back view. FIG. 6 is a sectional view illustrating the state in which the lens mount is attached to the mount for camera of the present embodiment. The mount for camera of the present embodiment is, similar to the conventional example, provided with the mount spring 2 shown in FIG. 2.

The mount for camera of the present embodiment is of the bayonet type molded by plastic material. Similar to the conventional example, a plurality of pawl portions 1a and protuberances 1b extending from these pawl portions 1a toward the back side are molded in unison on the inner diameter side of the mount 1. Also, in the mount 1, there is formed a hole 1c into which a pin for lens lock is fitted and holes 1d for mount fastener screws.

Meanwhile, the mount surface 1e of the mount 1 for camera, while, in the conventional metallic mount for camera, being the even flat plane, is, in the present embodiment, made concave or provided with a circumferential groove 1f of cross-sectional concave shape.

That is, as shown in FIG. 6, when the photographic lens is attached to the mount 1 for camera according to the present embodiment, since the circumferential groove 1f is formed in the mount surface 1e of the mount 1 for camera to a concave shape in cross-section, the place at which the mount surface 1e abuts on the mount surface 3b of the lens mount 3 is the outer peripheral portion and inner peripheral portion of the open surface of the circumferential groove 1f, i.e., only the portions of narrow width. Therefore, even if they are scratched, far smaller scratches are left than when the mount surface 1e is made to be the even flat plane. Accordingly, when the photographic lens is detached from the camera body, the scratches are inconspicuous and do not degrade the camera product. Incidentally, in FIG. 6, reference numeral 10 denotes the camera, 11 denotes a pentagonal prism, 12 denotes a mirror, 20 denotes the photographic lens, and 21 denotes a lens optical system.

Figure 7A:
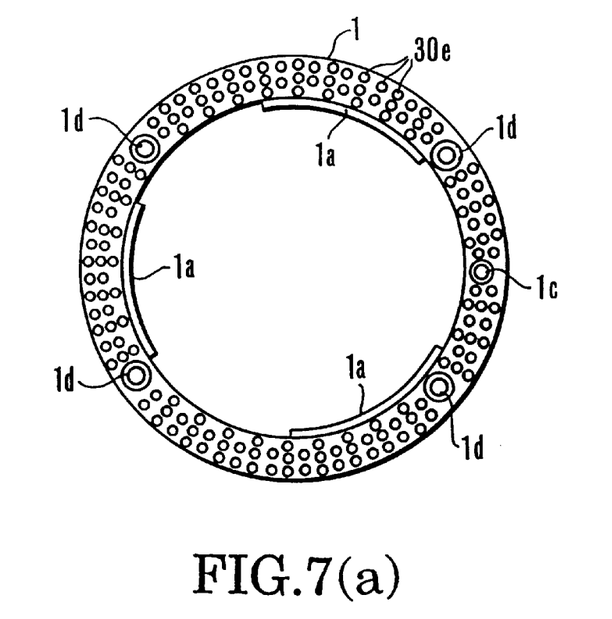
FIGS. 7(a) and 7(b) are respectively a front view and a back view of a second embodiment of the mount for camera.
Figure 7B:
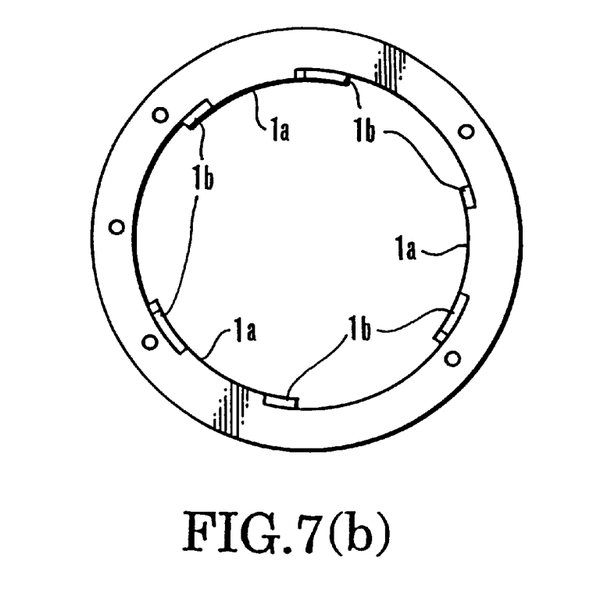
Figure 8:
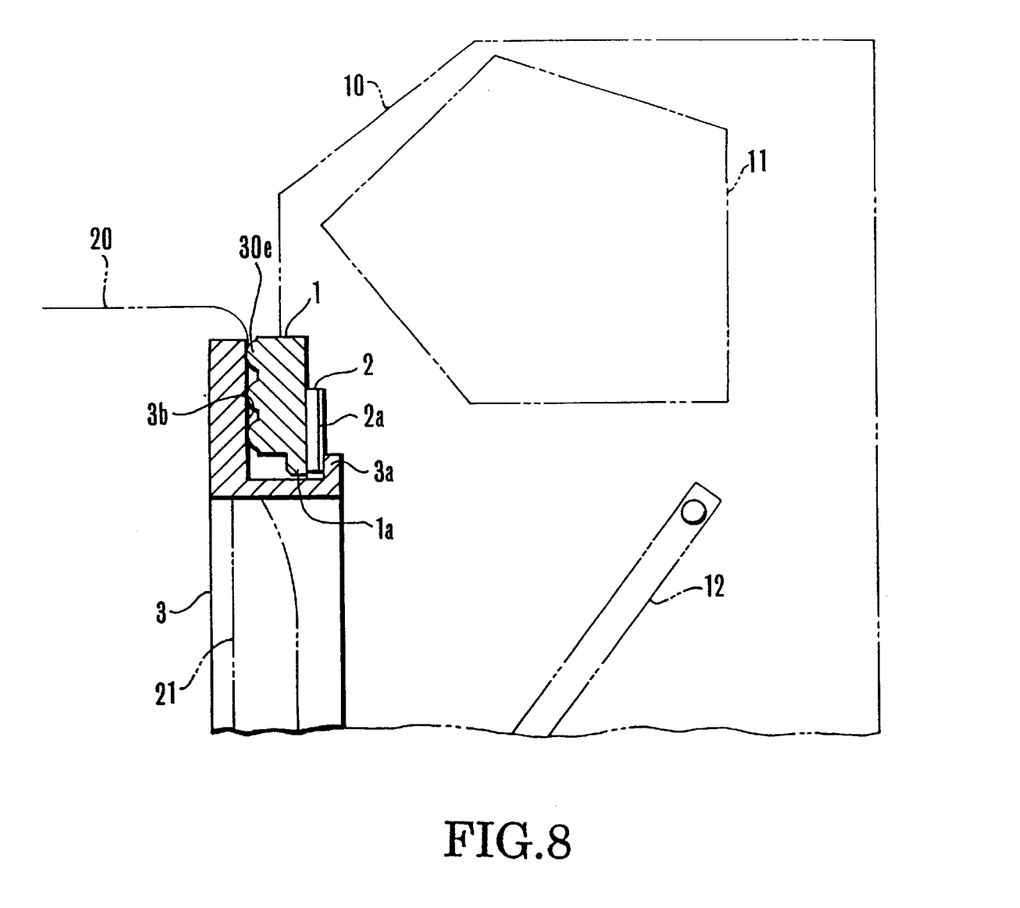
FIG. 8 is a sectional view of the state in which the photographic lens is coupled with the camera having the mount for camera of FIGS. 7(a) and 7(b).

Next, referring to FIGS. 7(a) and 7(b) and FIG. 8, a second embodiment is described. Incidentally, the parts similar to those of the first embodiment are not explained and are denoted by the same reference numerals.

A great number of minute protuberances 30e of semispheric shape are formed in the mount 1 for camera. Therefore, when the mount 1 for camera comes into sliding contact with the mount surface 3b of the lens mount 3, the frictional force is applied only to top portions of the minute protuberances 30e.

That is, the rub scratches which, when in the prior art, would be dispersed over the entire area of the mount surface 4e, appear at only the tips of the minute protuberances 30e. If microscopically observed, the scratches are present. However, to the human's eye, the scratches are not appreciable. So, they attract no attention at all.

Figure 9A:
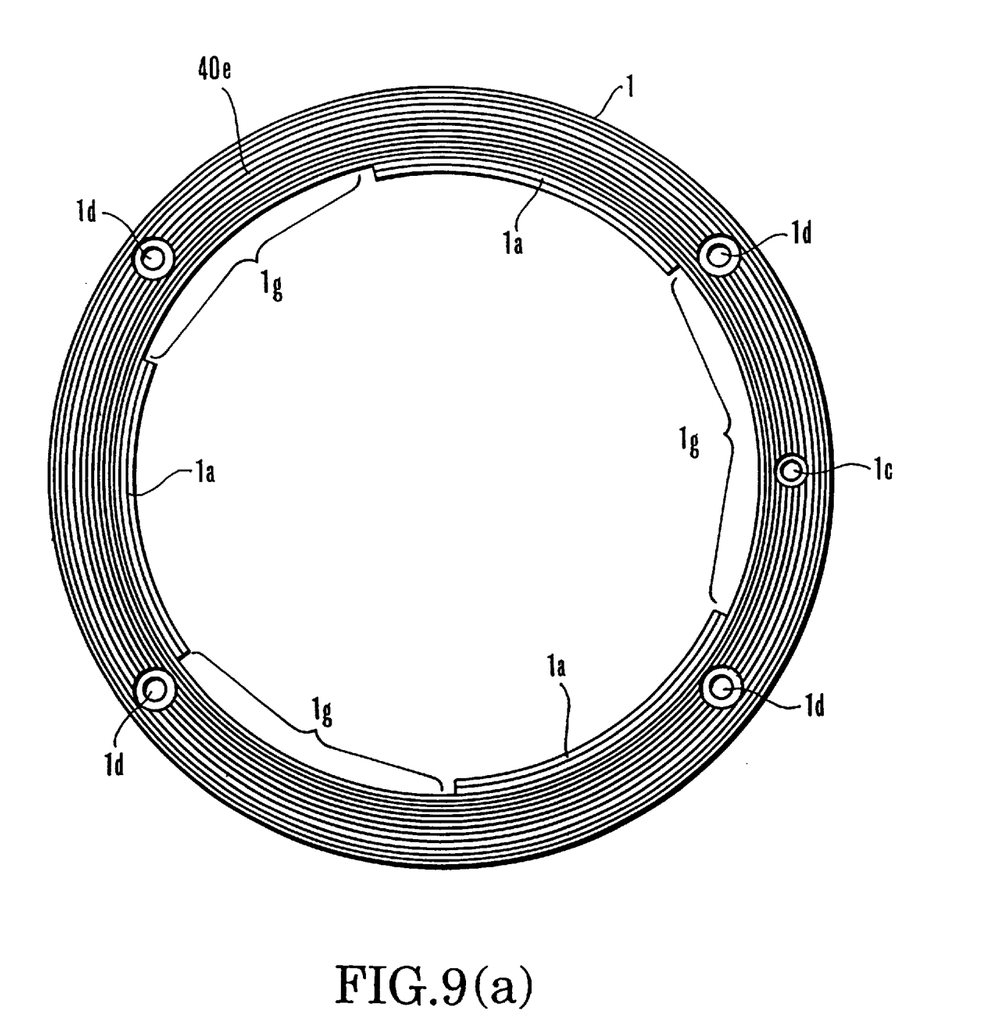
FIGS. 9(a) and 9(b) are respectively a front view and a back view of a third embodiment of the mount for camera.
Figure 9B:
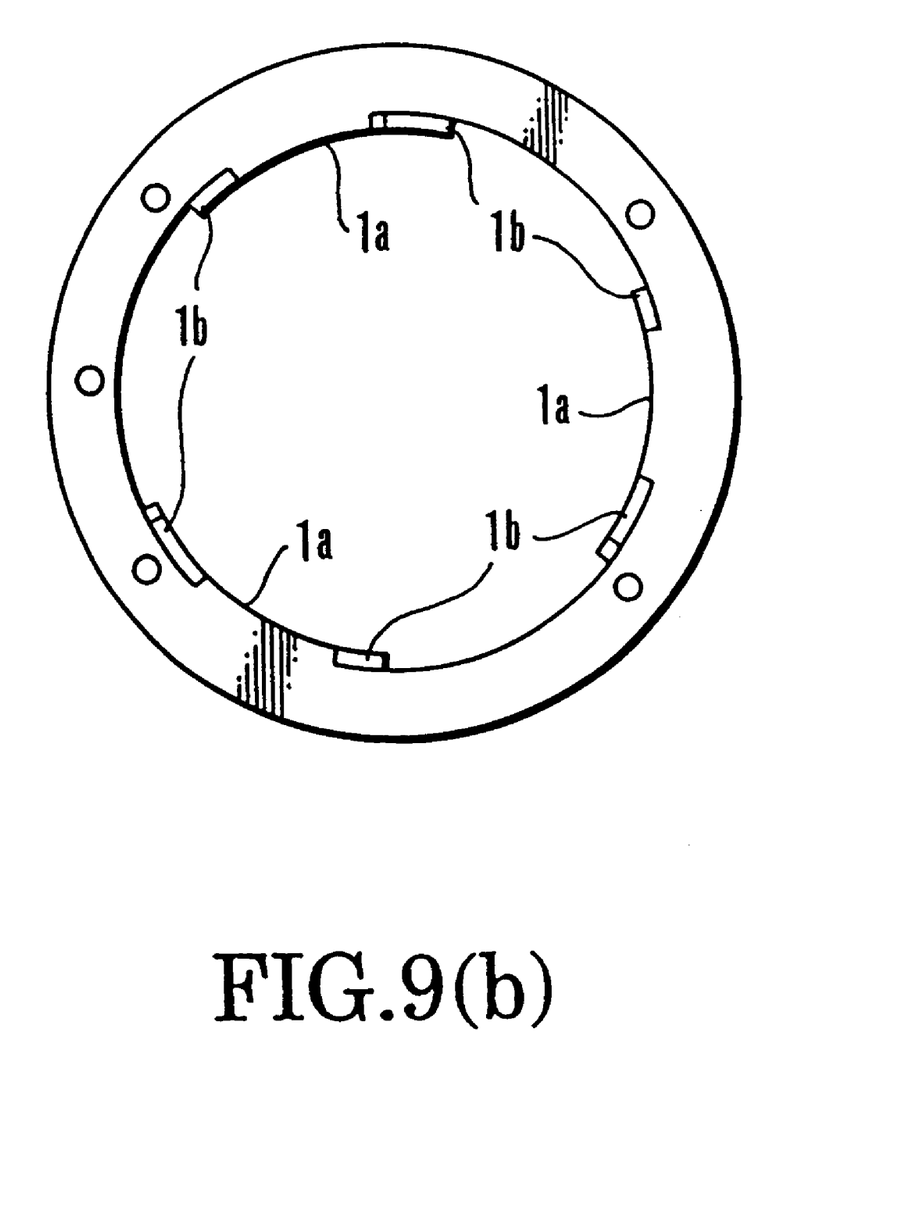
Figure 10:
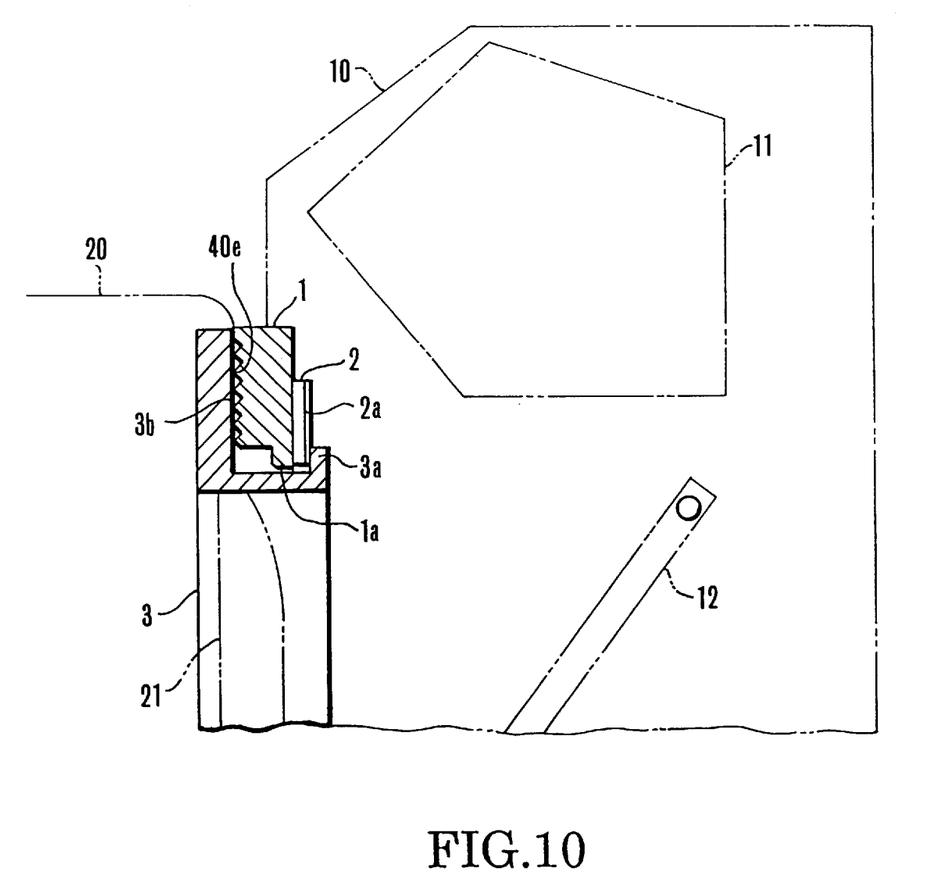
FIG. 10 is a sectional view of the state in which the photographic lens is coupled with the camera having the mount for camera of FIGS. 9(a) and 9(b).

Next, referring to FIGS. 9(a) and 9(b) and FIG. 10, a third embodiment is explained. Incidentally, the parts similar to those of the first embodiment are not explained and are denoted by the same reference numerals.

The mount 1 for camera has a plurality of ring-shaped protuberances 40e concentric with the mount 1. Therefore, when the mount 1 for camera comes into sliding contact with the mount surface 3b of the lens mount 3, the frictional force is applied only to summit portions of the ring-shaped protuberances 40e.

That is, even if the mount 1 for camera is molded by plastic material, only the tips of the ring-shaped protuberances 40e abut on the mount surface 3b of the lens mount 3. Therefore, the rub scratches which would be formed on the mount surface 4e when it is the even flat plane, if microscopically observed, are present on the tips of the ring-shaped protuberances 40e not appreciable to the human's eye. So they attract no attention at all.

It should be noted that though in the above described embodiments, the plastic mount has been used for the mount for camera, the mounts of the photographic lens, intermediate tube, extender, etc. may be made to be plastic mounts according to the present invention. Even in these cases, there are similar advantages.

What is claimed is:

1. A mount for camera adapted to be rotated to be attached to and detached from a mount of another apparatus, wherein:
    said mount for camera is molded of plastic material; and
    a circumferential groove is provided by molding on a surface of said mount for camera, wherein the surface of said mount for camera except said groove contacts a contact surface of the mount of said another apparatus, when the camera is attached to said another apparatus.

2. A mount for camera adapted to be rotated to be attached to and detached from a mount of another apparatus, wherein:
    said mount for camera is molded of plastic material; and
    a multiplicity of minute protuberances are provided by molding on a surface of said mount for camera, wherein the protuberances of said mount for camera contacts a contact surface of the mount of said another apparatus, when the camera is attached to said another apparatus.

3. A mount for camera adapted to be rotated to be attached to and detached from a mount of another apparatus, wherein:
    said mount for camera is molded of plastic material; and
    a plurality of ring-shaped protuberances are provided by molding on a surface of said mount for camera, wherein the ring-shaped protuberances of said mount for camera contact a contact surface of the mount of said another apparatus, when the camera is attached to said another apparatus.

4. A mount for a camera adapted to be attached to and detached from a mount of another apparatus, said mount for camera being molded of plastic material, wherein:
    a circumferential projection is provided by molding on a surface of said mount for camera, wherein the projection of said mount for camera contacts a contact surface of the mount of said another apparatus when said another apparatus is attached to said camera.

5. A camera having a mount which is molded of plastic material and which is adapted to be attached to and detached from a mount of another apparatus, wherein,
    a circumferential groove is provided by molding on a surface of said mount of said camera, wherein the surface of the mount of said camera except the groove contacts a contact surface of the mount of said another apparatus when said another apparatus is attached to said camera.

6. A camera according to claim 5, wherein said groove is molded integratedly with the molding of said mount of said camera.

7. A camera having a mount which is molded of plastic material and which is adapted to be attached to and detached from a mount of another apparatus, wherein:
    a multiplicity of minute protuberances are provided by molding on a surface of said mount of said camera, wherein the protuberances of said mount of said camera contacts a contact surface of the mount of said another apparatus, when the camera is attached to said another apparatus.

8. A camera according to claim 7, wherein said minute protuberances are molded integratedly with the molding of said mount of said camera.

9. A camera having a mount which is molded of plastic material which is adapted to be attached to and detached from a mount of another apparatus, wherein:

a plurality of ring-shaped protuberances are provided by molding on a surface of said mount of said camera, wherein the ring-shaped protuberances of said mount for camera contacts a contact surface of the mount of said another apparatus, when the camera is attached to said another apparatus.

10. A camera according to claim 9, wherein said ring-shaped protuberances are molded integratedly with the molding of said mount of said camera.

11. A camera having a mount which is molded of plastic material and which is adapted to be attached to and detached from a mount of another apparatus, wherein a circumferential projection is provided by molding on surface of said mount of said camera, and the projection of the mount of the camera contacts a contact surface of the mount of said another apparatus, when said another apparatus is attached to the camera.

* * * * *